US011131155B2

(12) United States Patent
Brown et al.

(10) Patent No.: US 11,131,155 B2
(45) Date of Patent: Sep. 28, 2021

(54) HELIX GAS SEPARATOR

(71) Applicant: Halliburton Energy Services, Inc., Houston, TX (US)

(72) Inventors: Donn J. Brown, Broken Arrow, OK (US); David C. Beck, Broken Arrow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 291 days.

(21) Appl. No.: 16/415,404

(22) Filed: May 17, 2019

(65) Prior Publication Data
US 2020/0362649 A1 Nov. 19, 2020

(51) Int. Cl.
*E21B 21/06* (2006.01)
*E21B 21/08* (2006.01)
*B01D 19/00* (2006.01)

(52) U.S. Cl.
CPC ........ *E21B 21/067* (2013.01); *B01D 19/0057* (2013.01); *E21B 21/08* (2013.01)

(58) Field of Classification Search
CPC ........ E21B 21/067; E21B 21/08; E21B 43/38; B01D 19/0057
See application file for complete search history.

(56) References Cited

U.S. PATENT DOCUMENTS

| | | | |
|---|---|---|---|
| 5,404,730 A | | 3/1995 | Westermeyer |
| 5,431,228 A | * | 7/1995 | Weingarten ............ B01D 17/00 166/357 |
| 5,482,117 A | * | 1/1996 | Kolpak ................. E21B 43/121 166/105.5 |
| 5,570,744 A | | 11/1996 | Weingarten et al. |

(Continued)

FOREIGN PATENT DOCUMENTS

| | | |
|---|---|---|
| CA | 2221191 C | 7/2007 |
| KR | 10-2016-0096653 A | 8/2016 |

(Continued)

OTHER PUBLICATIONS

International Search Report and Written Opinion issued in related PCT Application No. PCT/US2019/033672 dated Feb. 14, 2020, 14 pages.

*Primary Examiner* — Matthew R Buck
(74) *Attorney, Agent, or Firm* — John W. Wustenberg; Baker Botts L.L.P.

(57) ABSTRACT

Pumping of wellbore fluid to a surface may have a detrimental effect on the pump performance due to high gas concentrations in the fluid. A pump system that utilizes a helix gas separator provides greater pump efficiency by effectively removing the gas phase of the fluid. The wellbore fluid received at a pump system is directed from an intake to a gas separator that utilizes a stationary auger. The stationary auger induces rotational motion of the wellbore fluid causing the wellbore fluid to separate into a gas phase and a liquid phase. The gas phase is directed to the annulus while the liquid phase is directed to the pump for pumping to the surface. As the stationary auger remains stationary during production or separation of the wellbore fluid into a plurality of phase, fewer moving components are required which decreases overall production time while decreasing maintenance or operational costs.

18 Claims, 8 Drawing Sheets

(56) References Cited

U.S. PATENT DOCUMENTS

| | | | |
|---|---|---|---|
| 6,113,675 A * | 9/2000 | Branstetter | B01D 19/0052 |
| | | | 95/261 |
| 6,755,250 B2 | 6/2004 | Hall et al. | |
| 7,695,548 B1 * | 4/2010 | Grubb | E21B 43/38 |
| | | | 95/261 |
| 2007/0062374 A1 | 3/2007 | Kolle | |
| 2009/0272538 A1 * | 11/2009 | Kennedy | E21B 43/38 |
| | | | 166/369 |
| 2013/0319956 A1 * | 12/2013 | Tetzlaff | B04C 3/06 |
| | | | 210/787 |
| 2014/0216720 A1 | 8/2014 | Wang et al. | |
| 2017/0074083 A1 * | 3/2017 | Morton, III | E21B 43/38 |

FOREIGN PATENT DOCUMENTS

| | | |
|---|---|---|
| RU | 2547854 C1 | 4/2015 |
| RU | 153249 U1 | 7/2015 |

* cited by examiner

HELIX GAS SEPARATOR

TECHNICAL FIELD OF THE INVENTION

The present disclosure relates generally to separation of gas and liquid phases of downhole fluids and more particularly to a gas separator system to induce fluid rotation of fluid in a wellbore.

BACKGROUND

Hydrocarbons, such as oil and gas, are produced or obtained from subterranean reservoir formations that may be located onshore or offshore. The development of subterranean operations and the processes involved in removing hydrocarbons from a subterranean formation typically involve a number of different steps such as drilling a wellbore at a desired well site, treating the wellbore to optimize production of hydrocarbons, performing the necessary steps to produce the hydrocarbons from the subterranean formation, and pumping the hydrocarbons to the surface of the earth.

When performing subterranean operations, pump systems, for example, electrical submersible pump (ESP) systems, may be used when reservoir pressure alone is insufficient to produce hydrocarbons from a well. Presence of gas or free gas in a reservoir or fluid of a wellbore and the resulting multiphase flow behavior of the fluid has a detrimental effect on pump performance and pump system cooling. Economic and efficient pump operations may be affected by gas laden fluid. The presence of gas in a pump causes a drop in pressure created within the pump stages, reducing output of the pump. High concentrations of gas within a pump can create a condition commonly referred to as "gas lock", where gas is so prominent with the stages of the pump, the intended production liquid no longer reaches the surface. Separation of gas from the liquid phase of the fluid before entry into the pump improves pump performance, decreases pump vibration and reduces the operating temperature of the pump. Traditional rotary and vortex gas separators rely on rotating components to separate the two phases, a process which is limited by fluid velocities while requiring an increase in system horsepower requirements and increase erosion possibilities within the separation chamber. Erosion (which is a function of particle velocity as particles make contact with rotating paddles in a traditional vortex and rotary separator systems) cuts through separation chamber walls and housing, thus parting the pump string downhole. An effective, efficient and reliable pump gas separation system is needed.

Figure 1:
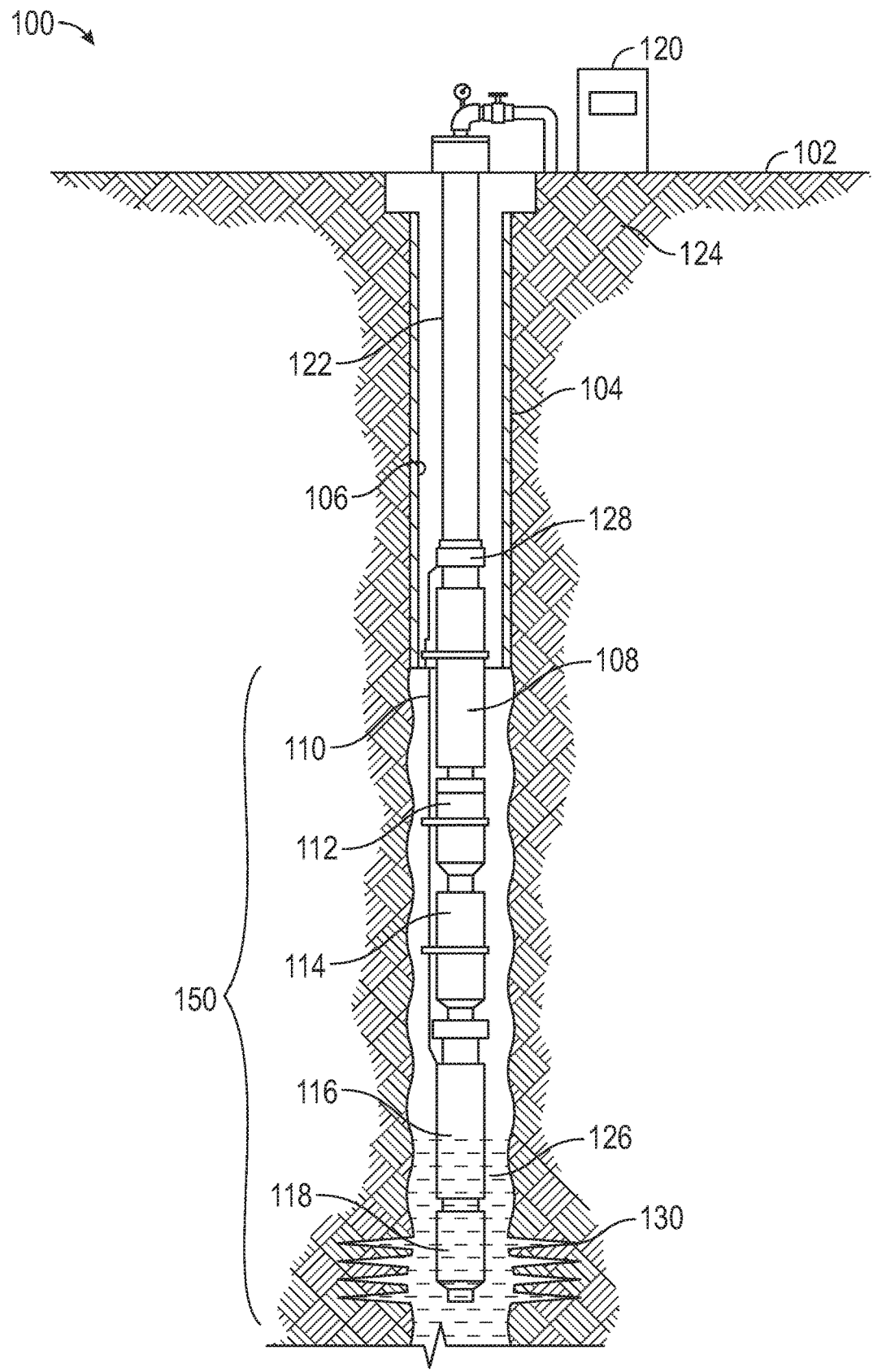
FIG. 1 is an illustrative well environment, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Traditional gas separators required a spinning or moving component or element to impart or induce a rotational flow of the downhole fluid to separate the different phases of the downhole fluid so that the pump only receives a liquid phase of the downhole fluid. However, moving components or elements experience wear and tear and increase overall costs of a system. According to one or more embodiments of the present disclosure, a gas separator of a pump system utilizes fewer movable components to provide efficient separation of the gas phase and the liquid phase of a downhole fluid. For example, a stationary auger induces fluid rotation and centrifugal separation of the gas phase and liquid phase of the downhole fluid. The stationary auger is used as the primary means to induce fluid rotation. As the separator utilizes a stationary auger, the separator is not limited in flow rate by the downhole fluid moving device as a high flow fluid moving device can be utilized and is not limited by a rotary separation element as the inducer is static. The gas separator is mechanically simpler, and more effective than those used in traditional pump systems such as ESP systems.

A gas separator, for example, a helix gas separator, according to one or more embodiments of the present disclosure, utilizes a stationary auger as a primary device to induce rotation of fluid received from the wellbore. The helix gas separator comprises a housing, an intake at one end of the housing, a discharge or crossover at an opposite end which can be coupled to the intake of a pump, a stationary auger disposed or positioned inside the housing, a space or mechanism for allowing a rotating shaft to pass through the center of the housing, a fluid moving device or fluid mover and any one or more other separating components or supports within the housing. The fluid received from the wellbore is forced into an intake by the fluid pressure moving into the fluid moving device. The fluid moving device causes a flow of the fluid stream so that the fluid flows through the stationary auger which induces rotational motion in the fluid through the interaction of the fluid with one or more vanes of the stationary auger in the separation chamber. As a result, a gas phase of the fluid moves to the inside of the separation chamber and exits in the wellbore through the crossover and discharge ports at a discharge end of the helix gas separator. The liquid phase moves to the outside of the separation chamber and enters the intake of the pump through the discharge end of the separator. The helix gas separator is more efficient as the helix gas separator has fewer moving components and rotational motion is induced by the interaction of the moving fluid with the stationary auger. The intake and stationary auger flow channels are designed such that the pressure drop across the intake and the auger flow channels is smaller than the pressure drop across the crossover and discharge ports. A fluid moving device is used with the gas separator to prevent fluid from being drawn into the helix gas separator through the discharge ports.

The helix gas separator of the present disclosure provides efficient and economical separation of gas from a gas laden fluid, for example, one or more downhole fluids associated with a hydrocarbon recovery or production operation. Traditional rotary and vortex separator designs include many moving components and these moving components are subjected to one or more abrasive downhole materials, for example, sand. Contact with such abrasive materials causes erosion to the moving components. The helix gas separator, according to one or more embodiments, reduces wear and tear due to erosion by utilizing a stationary auger which reduces maintenance and replacement costs as the number of moving components is minimized. Additionally, the intake and stationary auger flow channels are configured such that the pressure drop across them is smaller than the pressure drop across the crossover and exit ports and/or a fluid moving device is used within the gas separator and located between the separator intake and stationary auger to prevent fluid from being drawn into the separator through exit ports. Further, using the stationary auger as a separation inducer results in the ability to use a high flow fluid moving device which results in higher achievable flow rate through the gas separator. Using a stationary auger enhances the separation of a gas phase and a liquid phase from the wellbore fluid as the flow rate increases.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming, but would nevertheless be a routine undertaking for those of ordinary skill in the art having the benefit of the present disclosure.

The terms "couple" or "couples," as used herein are intended to mean either an indirect or direct connection. Thus, if a first device couples to a second device, that connection may be through a direct connection, or through an indirect electrical connection or a shaft coupling via other devices and connections.

FIG. 1 illustrates a well site environment 100, according to one or more aspects of the present invention. While well site environment 100 illustrates a land-based subterranean environment, the present disclosure contemplates any well site environment including a subsea environment. In one or more embodiments, any one or more components or elements may be used with subterranean operations equipment located on offshore platforms, drill ships, semi-submersibles, drilling barges and land-based rigs.

In one or more embodiments, well site environment 100 comprises a wellbore 104 below a surface 102 in a formation 124. In one or more embodiments, a wellbore 104 may comprise a nonconventional, horizontal or any other type of wellbore. Wellbore 104 may be defined in part by a casing string 106 that may extend from a surface 102 to a selected downhole location. Portions of wellbore 104 that do not comprise the casing string 106 may be referred to as open hole.

In one or more embodiments, various types of hydrocarbons or fluids may be pumped from wellbore 104 to the surface 102 using a pump system 150 disposed or positioned downhole, for example, within, partially within, or outside casing 106 of wellbore 104. In one or more embodiments, pump system 150 may comprise an electrical submersible pump (ESP) system. Pump system 150 may comprise a pump 108, an electrical cable 110, a separator 112, a seal or equalizer 114, a motor 116, and a sensor 118. The pump 108 may be an ESP, including but not limited to, a multi-stage centrifugal pump, a rod pump, a progressive cavity pump, any other suitable pump system or combination thereof. The pump 108 may transfer pressure to the fluid 126 or any other type of downhole fluid to propel the fluid from downhole to the surface 102 at a desired or selected pumping rate. Pump 108 couples to a gas separator 112. Gas separator 112 couples to a seal or equalizer 114 which couples to a motor 116. Motor 116 may be coupled to a downhole sensor 118. In one or more embodiments, an electrical cable 110 is coupled to the motor and to controller 120 at the surface 102. The electrical cable 110 may provide power to the motor 116, transmit one or more control or operation instructions from controller 120 to the motor 116, or both.

In one or more embodiments, fluid 126 may be a multi-phase wellbore fluid comprising one or more hydrocarbons. For example, fluid 126 may comprise a gas phase and a liquid phase from a wellbore or reservoir in a formation 124. In one or more embodiments, fluid 126 may enter the wellbore 104, casing 106 or both through one or more perforations 130 in the formation 124 and flow uphole to one or more intake ports of the pump system 150. The pump 108 may transfer pressure to the fluid 126 by adding kinetic energy to the fluid 126 via centrifugal force and converting the kinetic energy to potential energy in the form of pressure. In one or more embodiments, pump 108 lifts fluid 126 to the surface 102.

Fluid pressure in the wellbore 104 causes fluid 126 to enter the gas separator 112. Gas separator 112 separates a gas phase or component from the liquid phase of fluid 126 before the gas phase enters pump 108. In one or more embodiments, motor 116 is an electrical submersible motor configured or operated to turn pump 108 and may, for example, be a two pole, three-phase squirrel cage induction motor or any other motor operable or configurable to turn pump 108. Seal or equalizer 116 may be a motor protector that serves to equalize pressure and keep motor oil separate from fluid 126. In one or more embodiments, a production tubing section 122 may couple to the pump 108 using one or more connectors 128 or may couple directly to the pump 108. In one or more embodiments, any one or more production tubing sections 122 may be coupled together to extend the pump system 150 into the wellbore 104 to a desired or specified location. Any one or more components of fluid 126 may be pumped from pump 108 through production tubing 122 to the surface 102 for transfer to a storage tank, a pipeline, transportation vehicle, any other storage, distribution or transportation system and any combination thereof.

Figure 2:
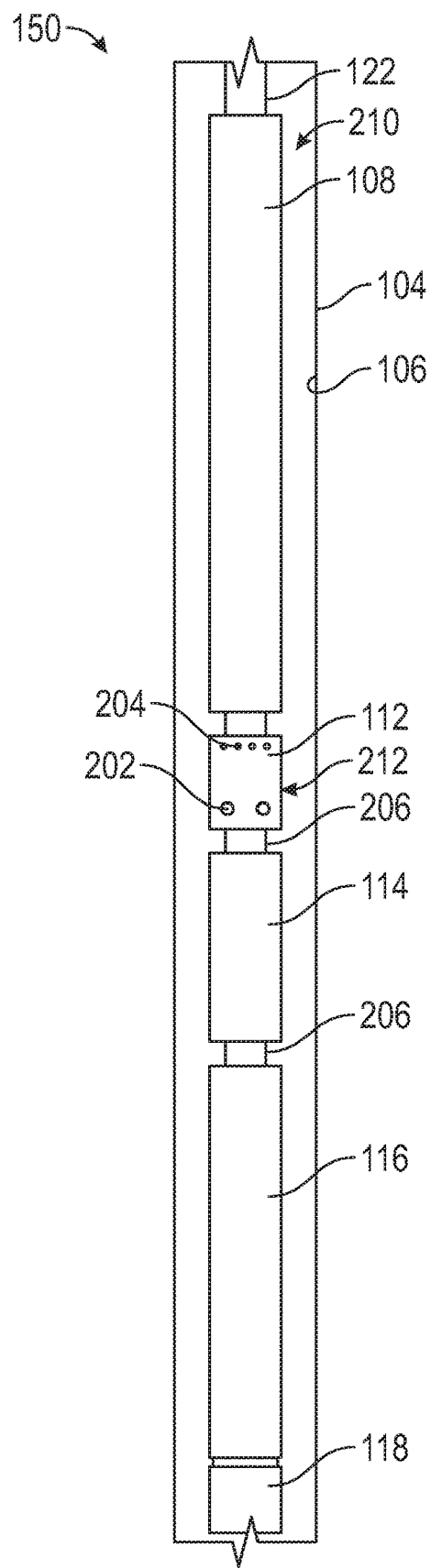
FIG. 2 is an illustrative pump system, according to one or more aspects of the present disclosure.

FIG. 2 is an illustrative pump system 150, according to one or more aspects of the present disclosure. A shaft may run through one or more components or elements of pump system 150 so as to couple the one or more components to one or more other components. The shaft may transmit or communicate rotation of motor 116 to one or more components or elements of gas separator 112. Any one or more components may be coupled via a coupling 206. Gas separator 112 may comprise a housing 212. One or more intake ports 202 may be disposed or positioned at a distal end of the housing 212 and one or more discharge ports 204 may be disposed or positioned at a proximal end of the housing 212. In one or more embodiments, the one or more intake ports 202 and one or more discharge ports 204 may be disposed or positioned circumferentially about the gas separator 112 at a downhole or a distal end and an uphole or a proximal end, respectively, of the gas separator 112. The one or more intake ports 202 allow fluid 126 to enter the gas separator 112. The one or more discharge ports 204 allow a gas phase or gas component of the fluid 126 to be discharged into an annulus 210 of the casing 106 or wellbore 104.

Figure 3:
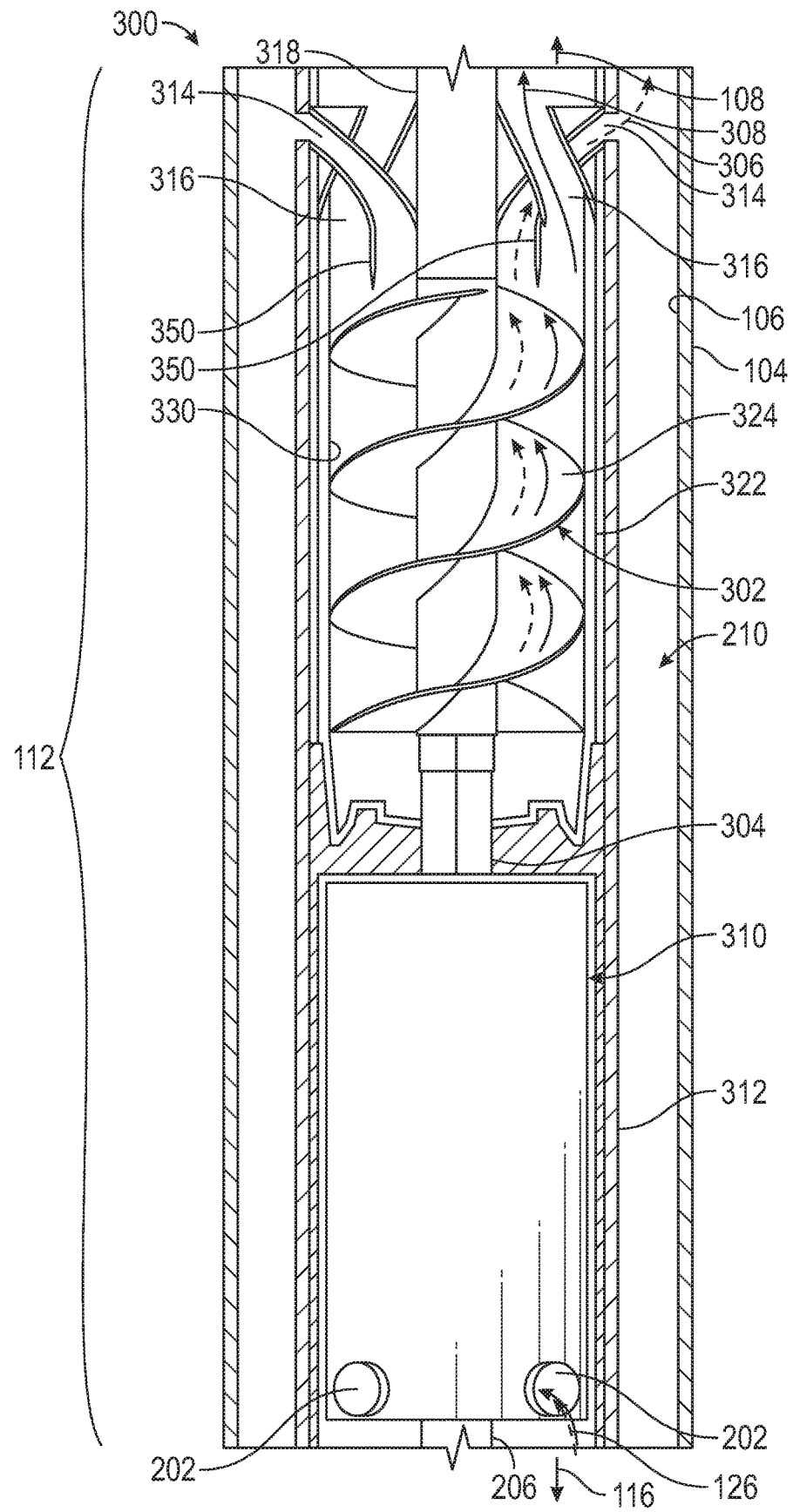
FIG. 3 is a partial cross-sectional view of an illustrative gas separator of a pump system, according to one or more aspects of the present disclosure.

FIG. 3 is a partial cross-sectional view 300 of an illustrative gas separator 112 of a pump 150, according to one or more aspects of the present disclosure. Gas separator 112 may couple to one or more other components, for example, to pump 108 via shaft 318. In one or more embodiments, shaft 318 runs through any one or more couplings 206 of FIG. 2. Gas separator 112 may be disposed or positioned within, coupled to or otherwise associated with an outer housing 312 of a downhole tool or system. In one or more embodiments, outer housing 312 may comprise a housing 212. Gas separator 112 may comprise a fluid mover 310, a stationary auger 302 and one or more discharge ports 314 and 316. Fluid mover 310 may be any type of fluid mover, for example, a rotating auger, an impeller, an impeller and a diffuser system, a rod lift system, any one or more embodiments as illustrated in FIG. 4, 5, 6 or 8 or any other type of fluid mover. Fluid mover 310 may comprise or be coupled to one or more intake ports 202 disposed or positioned circumferentially about a distal end of the fluid mover 310. The one or more intake ports 202 allow intake of fluid 126 from annulus 210 into the fluid mover 310 which communicates or flows the fluid 126 to the stationary auger 302. In one or more embodiments, rotating shaft 304 may run through shaft 318 or may be the same as shaft 318. The rotating shaft 304 may be driven by the motor 116. For example, when the motor 116 is energized, such as by a command from the controller 120 communicated to the motor 116 via electrical cable 110, the rotating shaft 304 may rotate. The rotating shaft 304 extends through the fluid mover 310 and the gas separator 302 to drive a pump 108 coupled to the gas separator 112. In one or more embodiments, the fluid mover 310 is coupled to the rotating shaft 304 and a motor 116.

In one or more embodiments, the stationary auger 302 is disposed or positioned within a separation chamber 330. The fluid mover 310 may couple to the separation chamber 330 at a downhole or distal end of the separation chamber 330. In one or more embodiments, the stationary auger 302, the separation chamber 330 or both are fluidically coupled to the one or more intake ports 202. For example, the separation chamber 330, the stationary auger 302 or both may be coupled to the fluid mover 310 via a support or other device including, but not limited to, the rotating shaft 304. Fluid mover 310 communicates or forces fluid 126 received at the one or more intake ports 202 through the separation chamber 330, stationary auger 302 or both. In one or more embodiments, the stationary auger 302 is coupled to a sleeve 322 such that the sleeve 322 maintains the stationary auger 302 in a stationary, non-rotating, position. The sleeve 322 may be disposed or positioned within the separation chamber 330 or the outer housing 312.

Figure 8:
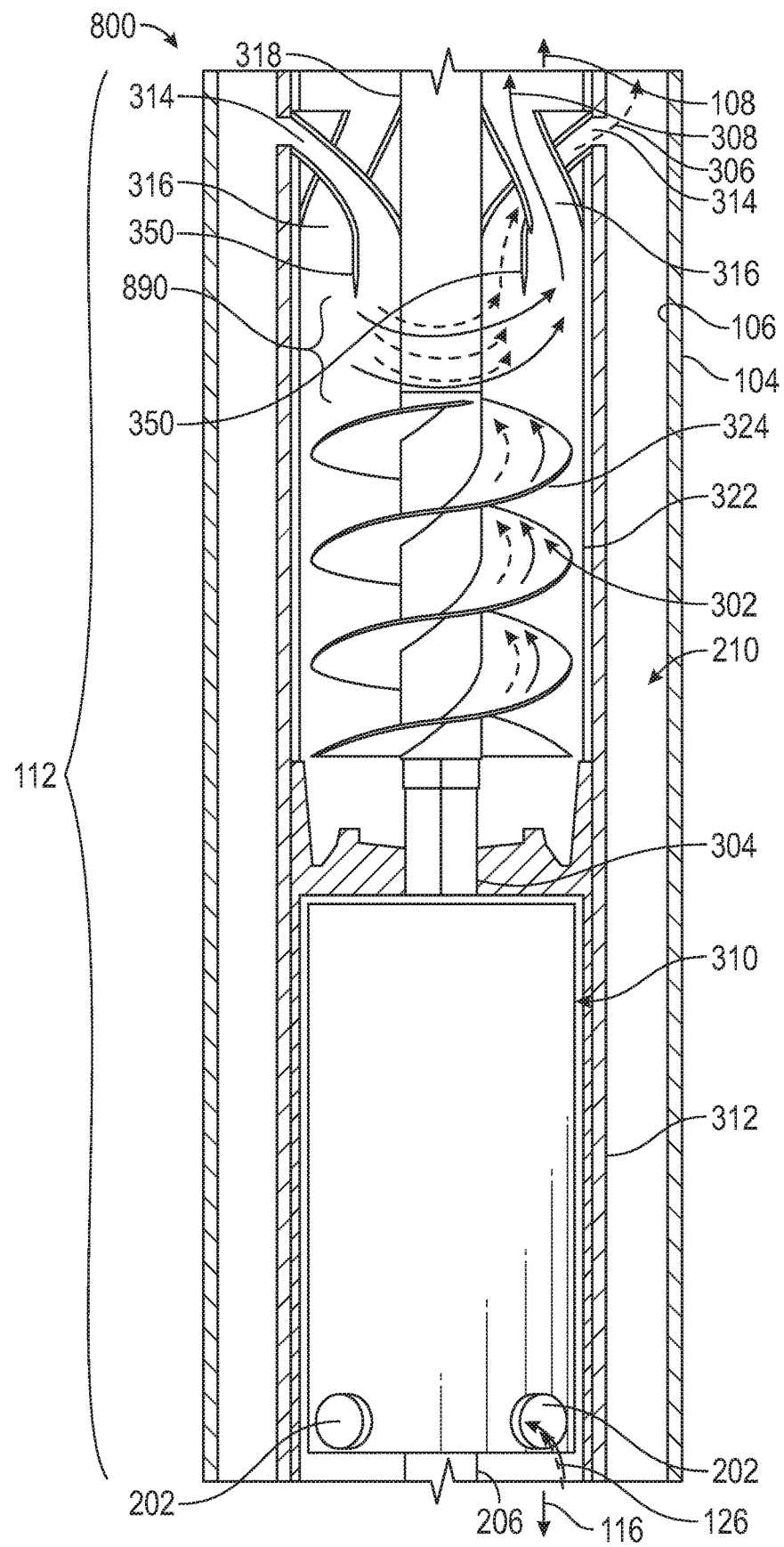
FIG. 8 is a partial cross-sectional view of an illustrative gas separator of a pump system, according to one or more aspects of the present disclosure.

In one or more embodiments, a separation chamber 330 is not disposed about the stationary auger 302. For example, as illustrated in FIG. 8 a pump system 800 comprises a separation chamber 890 fluidically coupled to a crossover 350 at a first end and a stationary auger 302 at a second end. As illustrated in FIG. 8, the stationary auger 302 may be positioned or disposed below the separation chamber 890 such that a vortex is induced by the fluid 126 or more particularly the gas phase 306 and liquid phase 308 flowing or forced through the separation chamber 890. In one or more embodiments, a separation chamber 890 may be fluidically coupled to the stationary auger 302 and the stationary auger 302 may be disposed or positioned with the separation chamber 330.

In one or more embodiments, the stationary auger 302 comprises one or more helixes or vanes 324. In one or more embodiments, the helixes or vanes 324 may be crescent-shaped. In one or more embodiments, the stationary auger 302 comprises one or more helixes or vanes 324 disposed about a solid core or an open core (for example, a coreless auger or an auger flighting). The stationary auger 302 may cause the fluid 126 to be separated into a liquid phase 308 and gas phase 306 based, at least in part, on rotational flow of the fluid 126. For example, the one or more helixes or vanes 324 may impart rotation on the fluid 126 as the fluid 126 flows through, across or about the one or more helixes or vanes 324. For example, fluid mover 310 forces the fluid 126 at a velocity or flow rate into the separation chamber 330 and up or across the one or more helixes or veins 324 of stationary auger 302. The induced rotation of the fluid 126 by the stationary auger 302 may be based, at least in part, on the velocity or flow rate of the fluid 126 from the fluid mover 310. For example, the fluid mover 310 may increase the flow rate or velocity of the fluid 126 to increase rotation of the fluid 126 through the stationary auger 302 to create a more efficient and effective separation of the fluid 126 into a plurality of phases, for example, a liquid phase 308 and a gas phase 306. As the fluid 126 flows through the stationary auger 302, centrifugal forces, static friction or both, cause the heavier component of the fluid 126, a liquid phase 308, to circulate along an outer perimeter of the stationary auger 112 while the lighter component of the fluid 126, the gas phase 306, is circulated along an inner perimeter of the stationary auger 302. In one or more embodiments, fluid 126 may begin to separate into a gas phase 306 and a liquid phase 308 while flowing through the fluid mover 310 and may continue to separate while flowing through stationary auger 302. In one or more embodiments, the liquid phase 308 may comprise residual gas that did not separate into the gas phase 306. However, the embodiments discussed herein minimize this residual gas to protect the pump 108 from gas build-up or gas lock. With respect to FIG. 8, the induced vortex in the separation chamber 890 may aid in separation of the fluid 126 into the gas phase 306 and liquid phase 308.

In one or more embodiments, the separated fluid (for example, liquid phase 308 and gas phase 306) is directed to a crossover 350. For example, the crossover 350 may be disposed or positioned at an uphole or a proximal end of the separation chamber 330 or outer housing 312. For example, the crossover 350 may fluidically couple the separation chamber 330 or otherwise direct one or more components or phases of fluid 126 to the pump 108 and subsequently to the annulus 210. The crossover 350 may comprise a plurality of channels, for example, a gas phase discharge port 314 (a first pathway) and a liquid phase discharge port 316 (a second pathway). A gas phase 306 of the fluid 126 may be discharged through a gas phase discharge port 314 and a liquid phase 308 of the fluid 126 may be discharged through a liquid phase discharge port 316. In one or more embodiments, gas phase discharge port 314 may correspond to any one or more discharge ports 204 of FIG. 2. In one or more embodiments, any one or more of the gas phase discharge ports 314 and the one or more liquid phase discharge ports 316 may be defined by a channel or pathway having an opening, for example, a teardrop shaped opening. With respect to FIG. 8, the separation chamber 890 may aid in directing the gas phase 306 and liquid phase 308 to the gas phase discharge port 314 and the liquid phase discharge port 316, respectively.

Figure 4:
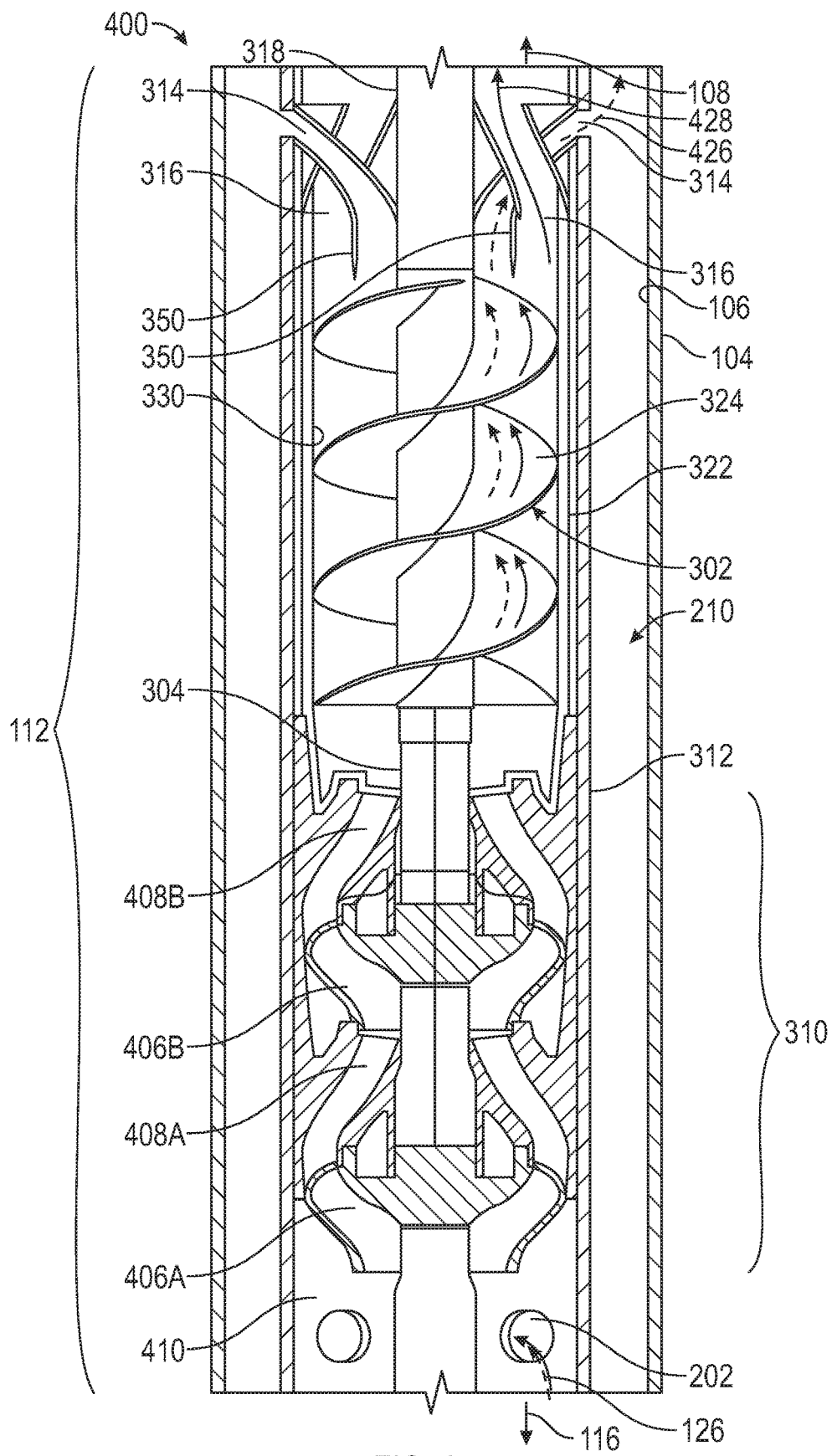
FIG. 4 is a partial cross-sectional view of an illustrative fluid mover of a gas separator of a pump system, according to one or more aspects of the present disclosure.

FIG. 4 is a partial cross-sectional view 400 of an illustrative fluid mover 310 of a gas separator 112 of a pump system 150, according to one or more aspects of the present disclosure. In one or more embodiments, fluid mover 310 may comprise a bottom portion 410, one or more impellers 406A and 406B (collectively referred to as impellers 406) and one or more diffusers 408A and 408B (collectively referred to as diffusers 408). In one or more embodiments, the fluid mover 310 comprises an impeller 406 without a diffuser 408. Bottom portion 410 of fluid mover 310 may comprise one or more intake ports 202 for receiving a fluid 126. The one or more impellers 406 rotate while the one or more diffusers 408 remain stationary. The one or more impellers 406 and the one or more diffusers 408 emulsify or mix the components of the liquid 126. The one or more impellers 406 and the one or more diffusers 408 cause the fluid 126 to exit the fluid mover 310 at a velocity or flow rate. In one or more embodiments, the rotating shaft 304 causes the one or more impellers 406 to spin or rotate to force the fluid 126 into the separation chamber 330 where the fluid 126 is separated into a gas phase 426 and a liquid phase 428 similar to the discussion of FIG. 3 of gas phase 306 and liquid phase 308. In one or more embodiments, the rotation of the one or more impellers 406 flows the fluid 126 at a velocity or flow rate to induce separation of the fluid 126 into a gas phase 306 and a liquid phase 308 as the fluid 126 flows through or about the stationary auger 302, for example, as discussed with respect to FIG. 5.

Figure 5:
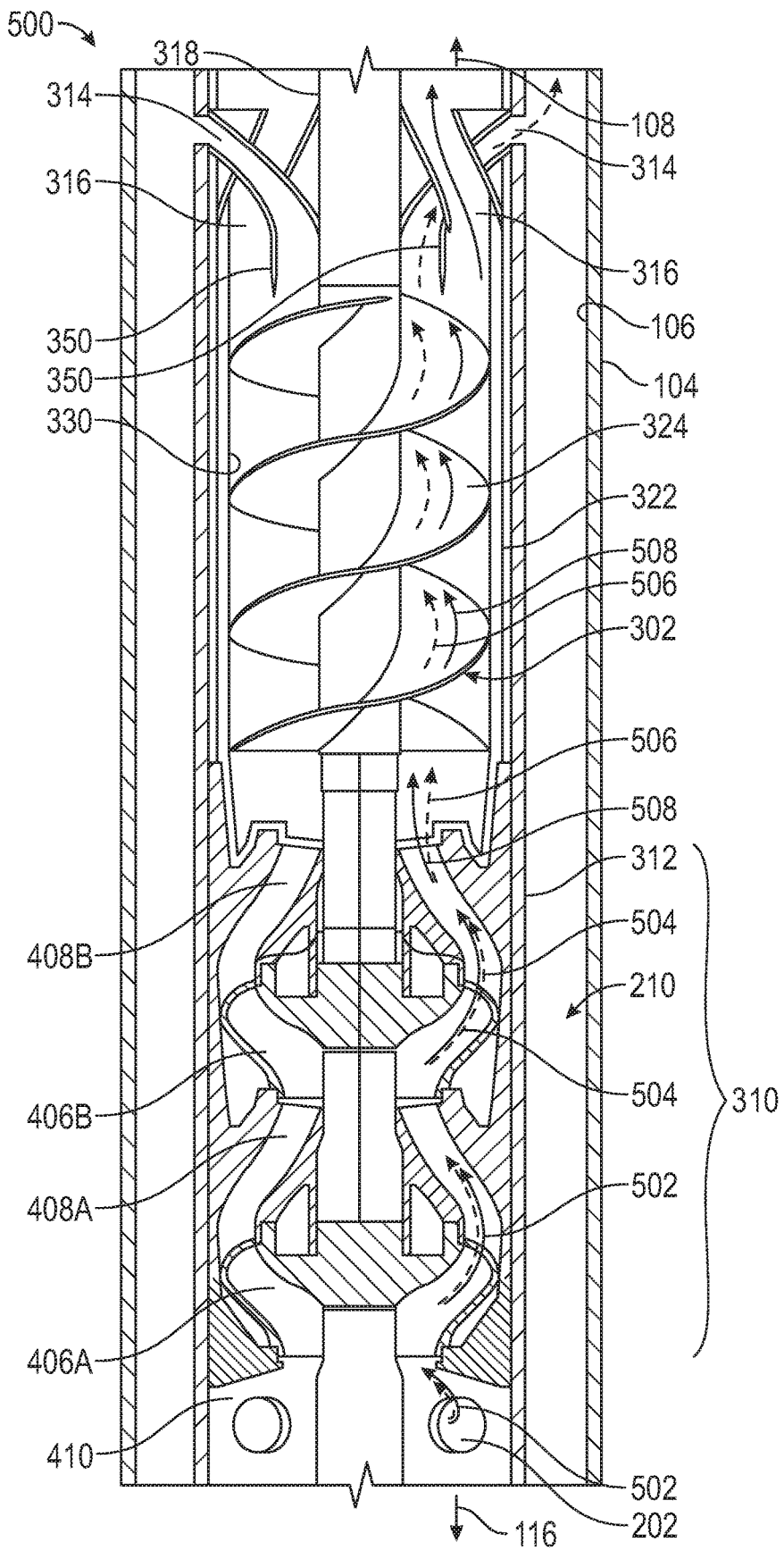
FIG. 5 is a partial cross-sectional view of an illustrative a gas separator of a pump system, according to one or more aspects of the present disclosure.

FIG. 5 is partial cross-sectional view 500 of an illustrative gas separator 112 of a pump system 150, according to one or more aspects of the present disclosure. In one or more embodiments, a fluid mover 310 may receive in fluid 502 or provide for fluid 502 to enter through one or more intake ports 202. While a fluid mover 310 that comprises one or more impellers 406 and one or more diffusers 408 is illustrated, the present disclosure contemplates any type of fluid mover. Fluid 502 enters or flows through one or more intake ports 202 into the fluid mover 310. Fluid 502 may comprise a plurality of phases, for example, a gas phase and a liquid phase. These phases may be mixed together, integrated or otherwise substantially not separated at the one or more intake ports 202, for example, as illustrated as a fluid 502. The one or more diffusers 408 and impellers 406 cause the received fluid 502 to flow at a flow rate or velocity through the fluid mover 310 as illustrated as a fluid 504. Fluid 504 is forced or flowed into the separation chamber 330 at a flow rate or velocity based, at least in part, on the rotation of the one or more impellers 406. In one or more embodiments, the fluid 504 may begin to separate in the fluid mover 310 as the velocity or flow rate is increased while in one or more other embodiments, the fluid 504 may remain substantially or partially mixed. In one or more embodiments, the fluid 504 may be the same as fluid 126. The fluid 504 enters the separation chamber 330 and is forced to flow through, across, around or about the one or more vanes or helixes 324 of the stationary auger 302.

As the fluid 504 flows, for example, in an induced rotational flow pattern, through the stationary auger 302, the fluid 504 begins to separate into a gas phase 506 and a liquid phase 508. The gas phase 506 may comprise all or substantially all of a gas from the fluid 126 or fluid 504 and liquid phase 508 may comprise all or substantially all of a liquid from the fluid 126 or fluid 504. Centrifugal forces, static friction or both cause the heavier liquid phase 508 to travel along an outer perimeter of the stationary auger 302 while the lighter gas phase 506 flows along an inner perimeter or closer to the center of the stationary auger 302. The greater the velocity or flow rate of the fluid 504, the better the separation of the fluid 504 into the gas phase 506 and the liquid phase 508.

When the gas phase 506 and the liquid phase 508 approach the crossover 350, each of the gas phase 506 and the liquid phase 508 are directed to different discharge ports. In one or more embodiments, the gas phase 506 is directed to a gas discharge port 316 and the liquid phase 508 is directed to a liquid discharge port 314. For example, the pump 108 creates a pressure differential between the gas separator 112 and the annulus 210. A gas phase 506 naturally flows toward a low pressure area or zone. That is, the gas separator 112 is at a higher pressure than a pressure in the annulus 210 which causes the gas phase 506 to naturally flow to the annulus 210. In one or more embodiments, a pump 108 couples to the gas separator 112 to receive the liquid phase 508. As discussed above, the liquid phase 508 may comprise a liquid and any residual gas not separated by the gas separator 112.

As the gas phase 506 and the liquid phase 508 come into contact with more surface area within the stationary auger 302 and the sleeve 322, resistance to flow may be greater due to surface tension. In one or more embodiments, one or more portions of the stationary auger 302 may be coated with a friction reducer, for example, a plastic including, but not limited to, a synthetic polymer such as polytetrafluoroethylene. As the gas phase 506 and liquid phase 508 circulate through or about the stationary auger 302, the gas phase 506 flows along an inner perimeter of the stationary auger 302 while the heavier liquid phase 508 flows along an outer perimeter of the stationary auger 302. As the gas phase 506 and liquid phase 508 circulate across, through or about the stationary auger 302, separation between the two phases increases such that at the crossover 350, the gas phase 506 is discharged through the gas phase discharge port or first pathway 314 while the liquid phase 508 is discharged through the liquid phase discharge port or second pathway 316. In this way, the portion of fluid 502 that is discharged to the pump 108 is substantially a liquid, liquid phase 508, such that the pump 108 is not subjected to the harmful effects of a gas, the gas phase 506, of the fluid 502.

Figure 6:
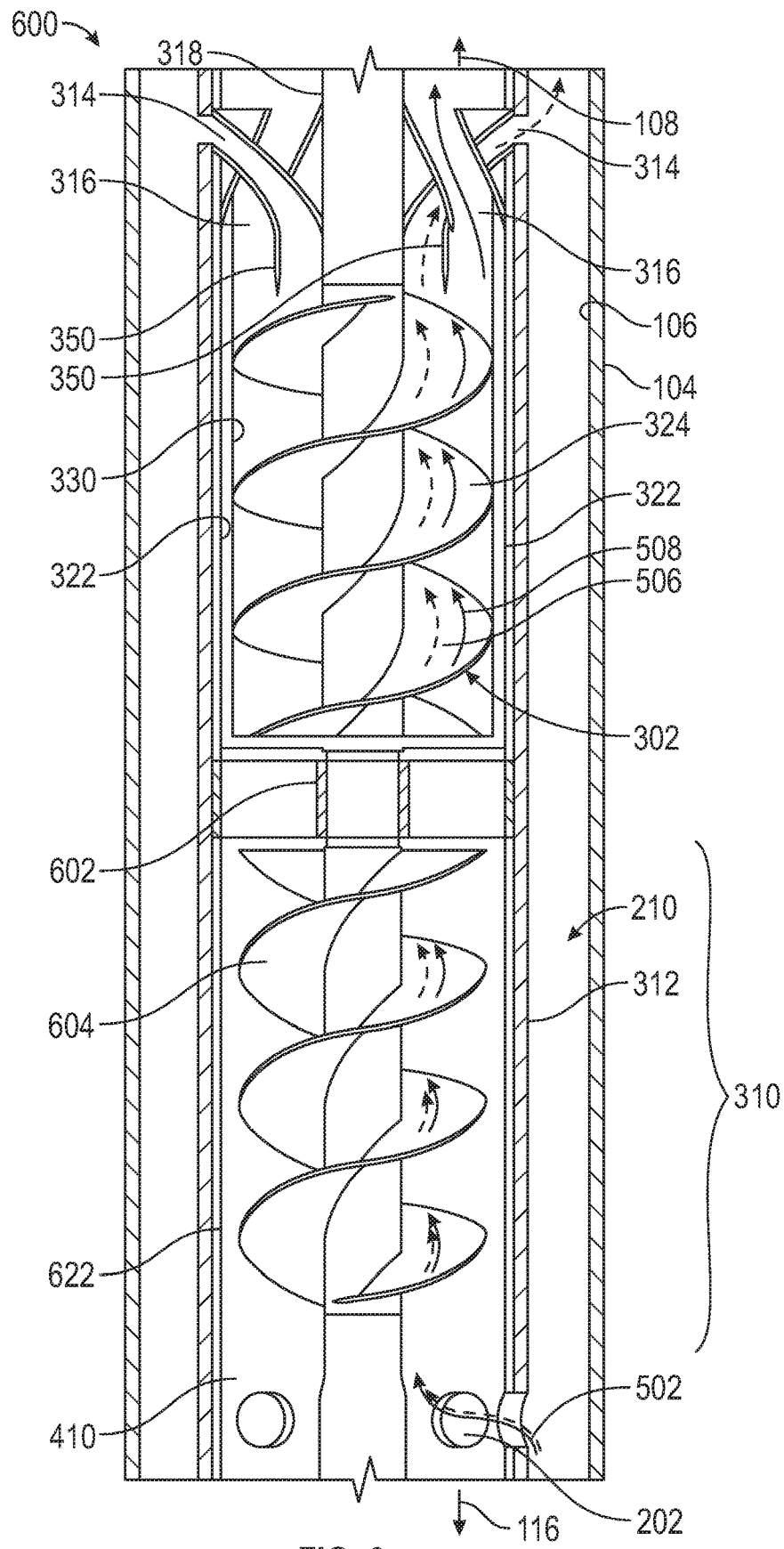
FIG. 6 is partial cross-sectional view of an illustrative a gas separator of a pump system, according to one or more aspects of the present disclosure.

FIG. 6 is a partial cross-sectional view 600 of an illustrative gas separator 112 of a pump system 150, according to one or more aspects of the present disclosure. A bearing support 602 may couple the separation chamber 330 to the fluid mover 310. In one or more embodiments, a fluid mover 310 may comprise an auger sleeve 622 disposed or positioned circumferentially within the fluid mover 310. Rotating auger 604 may be disposed or positioned within the auger sleeve 622 such that the rotating auger 604 rotates freely within the auger sleeve 622. When the motor 116 causes the rotating auger 604 to rotate, fluid 126 is drawn into the fluid mover 310 through one or more intake ports 202 and into the separation chamber 330 where the fluid 126 is separated as discussed with respect to FIG. 5.

Figure 7:
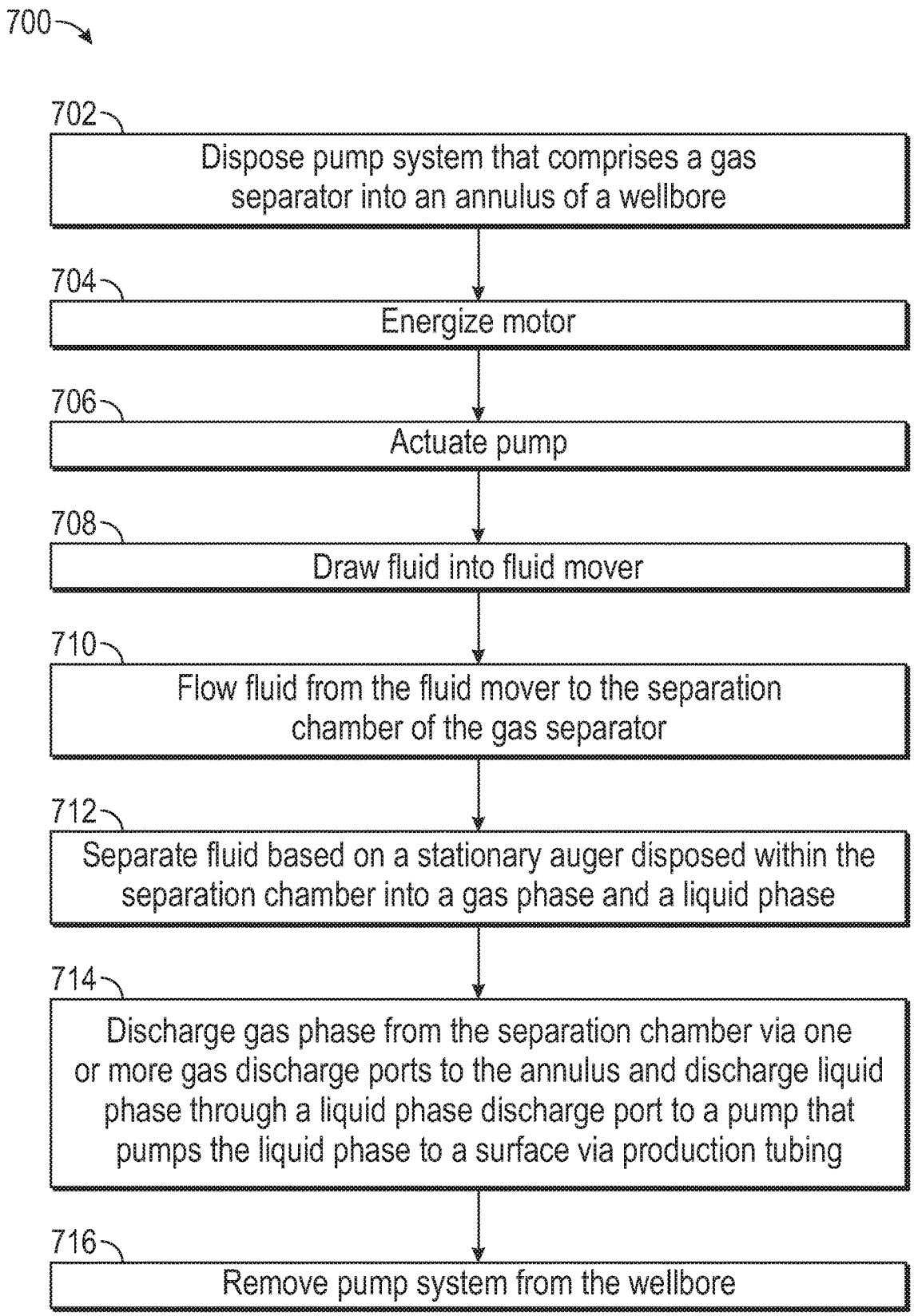
FIG. 7 is a flow chart illustrating a method of separating a fluid using a pump (ESP) system, according to one or more aspects of the present disclosure.

FIG. 7 is a flow chart illustrating a method for separating a fluid 126 using a pump system 150, according to one or more aspects of the present disclosure. At step 702, a pump system 150 is positioned or disposed in a wellbore 104 where the pump system 150 comprises a gas separator 112. In one or more embodiments, the pump system 150 may be part of or included with a downhole tool. The pump system 150 may be positioned or disposed such that one or more portions of the pump system 150 are submerged in or otherwise adjacent to a fluid 126 of FIG. 1 or a fluid 502 of FIG. 5.

At step 704, motor 116 is energized. Energizing motor 116 causes the rotating shaft 304 to rotate. Rotation of the shaft 304 drives the pump 108. At step 706, pump 108 is actuated based on the motor 116 and the rotating shaft 304. Actuation of the pump 108 alters or adjusts a pressure at the one or more intake ports 202 such that at step 708, fluid in the wellbore 104, for example, fluid 126, is induced, moved or flowed into the one or more intake ports 202 and to the fluid mover 310 of the gas separator 112.

At step 710, the fluid 126 is flowed from the fluid mover 310 to the separation chamber 330 of the gas separator 112. For example, fluid 126 flows through the fluid mover 310 and into the separation chamber 330, for example, as discussed above with respect to FIGS. 3-6. At step 712, as the fluid 126, fluid 502 or fluid 504 travels through the separation chamber 330, the stationary auger 302 disposed or positioned within the separation chamber 330 causes a separation of the fluid 126, fluid 502 or 504 into a gas phase 506 and a liquid phase 508. The gas phase 506 is lighter than the liquid phase 508 and travels along an inner perimeter of the one or more vanes 324 of the stationary auger 302 while the heavier liquid phase 508 travels along an outer perimeter of the one or more vanes 324 of the stationary auger 302. For example, the liquid phase 508 may travel about the outer perimeter of the stationary auger 302 such that the liquid phase 508 contacts sleeve 322 of the separation chamber 330.

At step 714, the gas phase 506 is discharged from the separation chamber 330 via one or more gas phase discharge ports 314 of crossover 350 and the liquid phase 508 is discharge from the separation chamber 330 via one or more liquid phase discharge ports 316 of crossover 350. In one or more embodiments, the gas phase 506 is discharged into the annulus 210. In one or more embodiments, the liquid phase 508 is discharged via one or more liquid phase discharge ports 316 to the pump 108 and the pump 108 pumps the liquid phase 508 to the surface 102, for example, via tubing 122. At step 716, pump system 150 may be removed from the wellbore 104.

According to one or more aspects of the present disclosure, the pump system 150 provides an efficient and cost-effective separation of the gas phase 506 and liquid phase 508 of a fluid 126 in a wellbore 104. By reducing or eliminating the gas phase 506 from the fluid 126 provides improved pump performance as the pump does not experience a gas blockage (the pump is not "gas blocked") and the pump is able to pump a production fluid (for example, liquid phase 508) without interruption which increases productivity and decrease time for completion of an operation, for example, a hydrocarbon recovery and production operation.

In one or more embodiments, a gas separator for separating a downhole fluid comprises an intake port, wherein the intake port receives the downhole fluid, a fluid mover fluidically coupled to the intake port, a stationary auger fluidically coupled to the fluid mover, wherein the stationary auger separates the downhole fluid into a gas phase and a liquid phase based, at least in part, on a rotational flow of the downhole fluid, a first pathway fluidically coupled to the stationary auger, wherein the gas phase is directed through the first pathway and a second pathway fluidically coupled to the second pathway, wherein the liquid phase is directed through the second pathway. In one or more embodiments, the fluid mover is coupled to a motor. In one or more embodiments, the fluid mover comprises one of a system with an impeller, an impeller and a diffuser or a rotating auger. In one or more embodiments, the pump comprises one of a rod pump and a progressive cavity pump. In one or more embodiments, the gas separator further comprises at least one of a separation chamber fluidically coupled to the stationary auger and the stationary auger disposed within a separation chamber. In one or more embodiments, the gas separator further comprises a sleeve coupled to the stationary auger, wherein the sleeve maintains the stationary auger in a non-rotating position. In one or more embodiments, the gas separator further comprises a rotating shaft, wherein the rotating shaft runs through the stationary auger to a pump.

In one or more embodiments, a method of separating a fluid into a plurality of phases comprises receiving at an intake a fluid, flowing the fluid through a stationary auger fluidically coupled to the intake, inducing rotation of the fluid based, at least in part, on the stationary auger, separating the fluid into a liquid phase and a gas phase as the fluid flows through the stationary auger, discharging the gas phase through a first pathway and discharging the liquid phase through a second pathway. In one or more embodiments, the method further comprises receiving at a fluid mover the fluid from the intake, forcing, by the fluid mover, the fluid at a flow rate to flow to the stationary auger and wherein the rotation of the fluid is based, at least in part, on the flow rate. In one or more embodiments, the fluid mover comprises one of a system with an impeller, an impeller and a diffuser or a rotating auger. In one or more embodiments, the pump comprises one of a rod pump or a progressive cavity pump. In one or more embodiments, the gas phase is discharged through the first pathway into an annulus and the liquid phase is discharged through the second pathway to a pump. In one or more embodiments, the method further comprises energizing a motor coupled to a rotating shaft disposed through the stationary auger and activating a pump coupled to the rotating shaft to reduce back pressure at the intake port to induce flow of the fluid into the intake port. In one or more embodiments, the method further comprises maintaining the stationary auger in a stationary position using a sleeve coupled to the stationary auger.

In one or more embodiments, a pump system comprises a pump and a gas separator coupled to the pump, wherein the gas separator comprises an intake port, wherein the intake port receives a fluid, a stationary auger fluidically coupled to the intake port, wherein the stationary auger separates the fluid into a gas phase and a liquid phase, a first pathway fluidically coupled to the stationary auger, wherein the gas phase is directed through the first pathway and a second pathway fluidically coupled to the stationary auger, wherein the liquid phase is directed through the second pathway. In one or more embodiments, the gas separator further comprises a fluid mover fluidically coupled to the intake port. In one or more embodiments, at least one of the fluid mover comprises one of a system with an impeller, an impeller and a diffuser or a rotating auger and the pump comprises one of a rod pump or a progressive cavity pump. In one or more embodiments, the stationary auger is coupled to a sleeve, wherein the sleeve maintains the stationary auger in a non-rotating position. In one or more embodiments, the pump system further comprises a rotating shaft coupled to a motor and the pump, wherein the rotating shaft runs through the stationary auger from the motor to the pump. In one or more embodiments, the gas separator further comprises a separation chamber fluidically coupled to the intake port, wherein at least one of the stationary auger is disposed within the separation chamber and the separation chamber is fluidically coupled to the stationary auger.

As would be appreciated by those of ordinary skill in the art, with the benefit of this disclosure, the methods of the present disclosure may be implemented on virtually any type of information handling system regardless of the platform being used. Moreover, one or more elements of the information handling system may be located at a remote location and connected to the other elements over a network. In a further embodiment, the information handling system may be implemented on a distributed system having a plurality of nodes. Such distributed computing systems are well known to those of ordinary skill in the art and will therefore not be discussed in detail herein.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

A number of examples have been described. Nevertheless, it will be understood that various modifications can be made. Accordingly, other implementations are within the scope of the following claims.

What is claimed is:

1. A gas separator for separating a downhole fluid, comprising:
   an intake port, wherein the intake port receives the downhole fluid;
   a fluid mover fluidically coupled to the intake port;
   a stationary auger fluidically coupled to the fluid mover, wherein the stationary auger separates the downhole fluid into a gas phase and a liquid phase based, at least in part, on a rotational flow of the downhole fluid, wherein the fluid mover forces the downhole fluid received at the intake port through the stationary auger;
   a first pathway fluidically coupled to the stationary auger, wherein the gas phase is directed through the first pathway; and
   a second pathway fluidically coupled to the stationary auger, wherein the liquid phase is directed through the second pathway.

2. The gas separator of claim 1, wherein the fluid mover is coupled to a motor.

3. The gas separator of claim 2, wherein the fluid mover comprises at least one of a rotating auger, an impeller, an impeller and a diffuser system or a rod lift system.

4. The gas separator of claim 1, further comprising:
   a pump fluidically coupled to the second pathway; and
   a production tubing section coupled to the pump.

5. The gas separator of claim 1, further comprising a separation chamber, wherein at least one of the separation chamber is fluidically coupled to the stationary auger and the stationary auger is disposed within the separation chamber.

6. The gas separator of claim 1, further comprising a sleeve coupled to the stationary auger, wherein the sleeve maintains the stationary auger in a non-rotating position.

7. The gas separator of claim 1, further comprising a rotating shaft, wherein the rotating shaft runs through the stationary auger to a pump.

8. A method of separating a fluid into a plurality of phases comprises:
   receiving at an intake a fluid;
   receiving at a fluid mover the fluid from the intake;
   flowing the fluid through a stationary auger fluidically coupled to the fluid mover, wherein the fluid mover forces the fluid received at the intake through the stationary auger;
   inducing rotation of the fluid based, at least in part, on the stationary auger;
   separating the fluid into a liquid phase and a gas phase as the fluid flows through the stationary auger;
   discharging the gas phase through a first pathway; and
   discharging the liquid phase through a second pathway.

9. The method of claim 8, wherein the fluid mover comprises at least one of a rotating auger, an impeller, an impeller and a diffuser system or a rod lift system.

10. The method of claim 8, wherein the second pathway fluidically couples to a pump and a production tubing section couples to the pump.

11. The method of claim 8, wherein the gas phase is discharged through the first pathway into an annulus and the liquid phase is discharged through the second pathway to a pump.

12. The method of claim 8, further comprising:
   energizing a motor coupled to a rotating shaft disposed through the stationary auger; and activating a pump coupled to the rotating shaft, wherein activating the pump induces flow of the fluid into the intake.

13. The method of claim 8, further comprising maintaining the stationary auger in a stationary position using a sleeve coupled to the stationary auger.

14. A pump system, comprising:
   a pump; and
   a gas separator coupled to the pump, wherein the gas separator comprises:
      an intake port, wherein the intake port receives a fluid;
      a fluid mover fluidically coupled to the intake port;
      a stationary auger fluidically coupled to the fluid mover, wherein the stationary auger separates the fluid into a gas phase and a liquid phase, wherein the fluid mover forces the fluid received at the intake port through the stationary auger;
      a first pathway fluidically coupled to the stationary auger, wherein the gas phase is directed through the first pathway; and
      a second pathway fluidically coupled to the stationary auger, wherein the liquid phase is directed through the second pathway.

15. The system of claim 14, wherein the fluid mover comprises at least one of a rotating auger, an impeller, an impeller and a diffuser system or a rod lift system.

16. The system claim 14, wherein the stationary auger is coupled to a sleeve, wherein the sleeve maintains the stationary auger in a non-rotating position.

17. The system of claim 14, further comprising a rotating shaft coupled to a motor and the pump, wherein the rotating shaft runs through the stationary auger from the motor to the pump.

18. The system of claim 14, wherein the gas separator further comprises a separation chamber fluidically coupled to the intake port, wherein at least one of the stationary auger is disposed within the separation chamber and the separation chamber is fluidically coupled to the stationary auger.

* * * * *